US008065614B2

(12) United States Patent
Ma et al.

(10) Patent No.: US 8,065,614 B2
(45) Date of Patent: Nov. 22, 2011

(54) SYSTEM FOR DISPLAYING VIDEO AND METHOD THEREOF

(75) Inventors: Tsang Fai Ma, Scarborough (CA); Jitesh Arora, Thornhill (CA)

(73) Assignee: ATI Technologies, Inc., Markham, Ontario (CA)

( * ) Notice: Subject to any disclaimer, the term of this patent is extended or adjusted under 35 U.S.C. 154(b) by 2132 days.

(21) Appl. No.: 10/409,717

(22) Filed: Apr. 9, 2003

(65) Prior Publication Data
US 2004/0201608 A1   Oct. 14, 2004

(51) Int. Cl.
G06F 3/00 (2006.01)
G06F 3/048 (2006.01)
G06F 3/16 (2006.01)
G06F 3/033 (2006.01)

(52) U.S. Cl. ........ 715/723; 715/790; 715/768; 715/781; 345/501

(58) Field of Classification Search .................. 715/723, 715/781, 768, 790; 345/501
See application file for complete search history.

(56) References Cited

U.S. PATENT DOCUMENTS

| | | | | |
|---|---|---|---|---|
| 5,293,470 A | * | 3/1994 | Birch et al. | 345/634 |
| 5,530,797 A | * | 6/1996 | Uya et al. | 345/532 |
| 5,651,107 A | * | 7/1997 | Frank et al. | 715/768 |
| 5,818,441 A | * | 10/1998 | Throckmorton et al. | 715/717 |
| 5,838,318 A | * | 11/1998 | Porter et al. | 715/790 |
| 5,933,811 A | * | 8/1999 | Angles et al. | 705/14 |
| 6,229,541 B1 | * | 5/2001 | Kamen et al. | 715/719 |
| 6,252,595 B1 | | 6/2001 | Birmingham et al. | |
| 6,512,529 B1 | * | 1/2003 | Janssen et al. | 715/790 |
| 7,051,287 B1 | * | 5/2006 | Tsunoda | 715/778 |
| 2001/0047435 A1 | * | 11/2001 | Dove | 709/310 |

OTHER PUBLICATIONS

Tsaoussidis et. al., Resource control of distributed applications in heterogeneous environments, 2003, 2003. ICC '03. IEEE International Conference on Communications, vol. 2;p. 1479-1483.*

* cited by examiner

*Primary Examiner* — Chat Do
*Assistant Examiner* — Jordany Nunez (57) ABSTRACT

A system and method for providing playback of multiple video streams simultaneously is shown and described. A priority is assigned to individual windows of a plurality of windows used for playback of the video streams. A current window being accessed by a user is assigned a higher priority than nonactive, or background, windows. Playback characteristics, such as video resolution, transparency, and audio volume, are reduced in the playback of videos presented in nonactive windows in relation to video played in the active window. Accordingly, a user's attention may be drawn more to the active window than to the nonactive windows, while allowing the video and audio data in the nonactive windows to be provided to the user.

4 Claims, 6 Drawing Sheets

SYSTEM FOR DISPLAYING VIDEO AND METHOD THEREOF

FIELD OF THE DISCLOSURE

The present disclosure relates generally to displaying video and more particularly to displaying multiple video streams simultaneously.

BACKGROUND

As the information age progresses, more and more information is available to users. In addition, technology advances have allowed data processing systems, such as personal computers, to be able to process and display more information simultaneously to a user. The increased display of information to a user can overwhelm the user, or become distracting. For example, it has been observed that when a system displays multiple windows of video simultaneously that the video associated with one or more of the windows can be distracting to the user. Therefore a method or system of displaying video to overcome these problems would be desirable.

BRIEF DESCRIPTION OF THE DRAWINGS

Specific embodiments of the present disclosure are shown and described in the drawings presented herein. Various advantages, features and characteristics of the present disclosure, as well as methods, operations and functions of related elements of structure, and accommodation of parts and economies of manufacture, will become apparent upon consideration of the following description and claims with reference to the accompanying drawings, all of which form a part of this specification, and wherein:

DETAILED DESCRIPTION OF THE FIGURES

At least one embodiment of the present invention provides for a method of altering multimedia properties based on the status of a video stream being displayed. Different video streams are played to a user on an information handling system. The method includes determining that a first video stream is to be displayed in a first window simultaneously with a second video stream to be displayed in a second window. The second window is different from the first window. A window represents a portion of a displayed desktop provided to the user through the information handling system. For example, a window can include a system or application window associated with an operating system, such as the Microsoft Windows operating system. Alternatively, a window can include a portion of a desktop or display used to present a video stream to a user. The method also includes facilitating, at a first time, a modification of the first video stream to generate a modified first video stream having a first video characteristic different than the first video stream when the second window is active. For example, as the second window is made active, such as by setting the second window on top of the first window, audio and video properties for the first video stream can be made reduced in comparison to the second video stream. An advantage of at least one embodiment of the present invention is that a user's attention can be drawn to an active window when multiple windows are displayed. Another advantage of the present invention is that video streams not being focused for the user's attention can be provided at a reduced quality, reducing processing required by the system to present all available video streams at an optimum playback quality.

Figure 1:
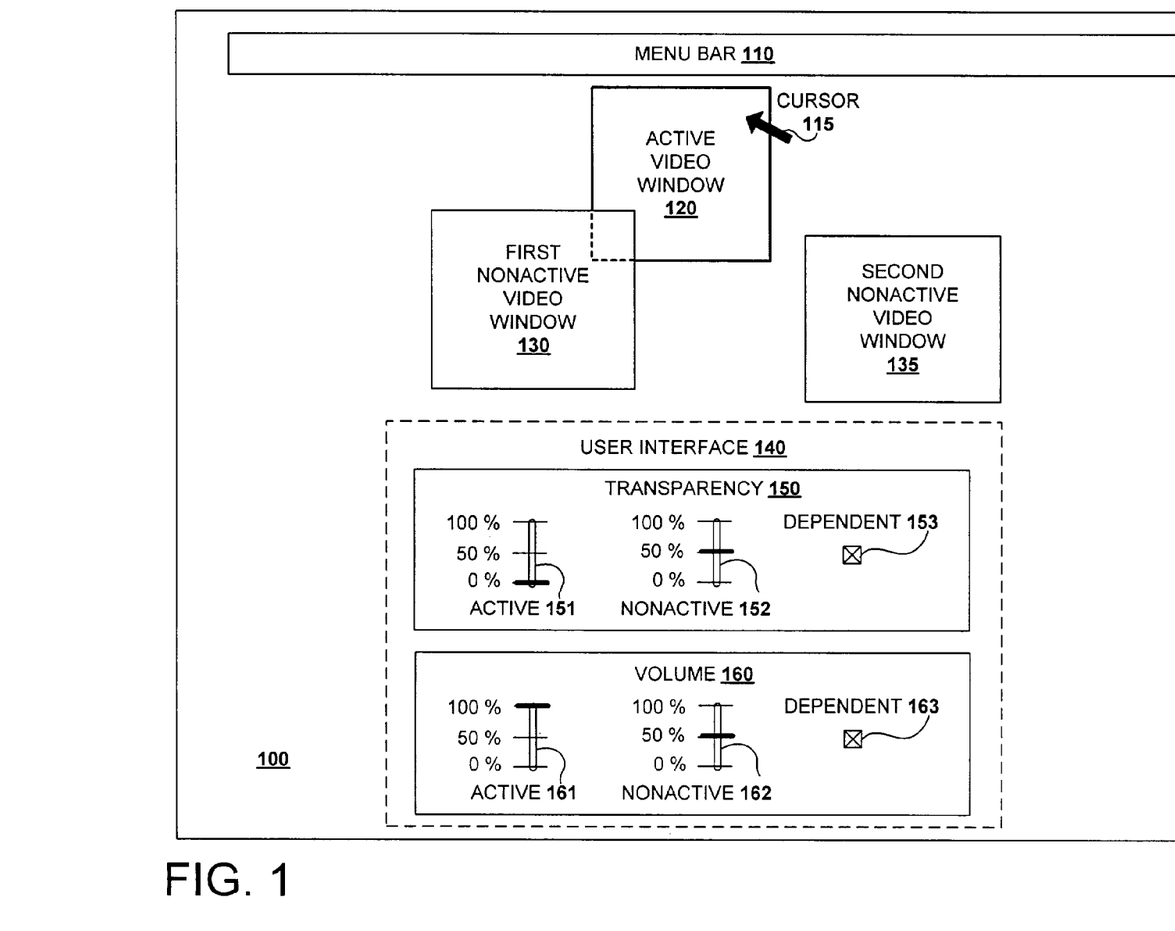
FIG. 1 is a block diagram illustrating a computer screen having multiple windows open in accordance within one embodiment of the present invention.

Referring now to FIG. 1, a block diagram illustrating a computer screen displaying multiple windows of video is shown and referenced generally as display 100, according to one embodiment of the present invention. Display 100 displays a menu bar 110, an active video window 120, a first nonactive video window 130, a second nonactive video window 135, a curser 115, and a user interface window 140. In one embodiment, display 100 includes a screen associated with a display device, such as a computer monitor.

A system providing images to display 100 is capable of displaying multiple video windows, such as video windows 120, 130, and 135, simultaneously. Video windows are used herein to describe portions of the video window used to describe portions of a screen, such s display 100, used to provide video. The video windows can include application, or system windows, associated with an operating system, used to present video to a user. Alternatively, video windows can also include a portion of another video window, such as Picture-In-Picture (PIP) windows used to alternate video within a video window. Similarly, a video window can be used to represent a portion of a video window used to display closed-captioning or logos as will subsequently be discussed. Other types of video windows can be included. It should be noted that a video window includes any portion of a desktop or display, such as display 100, used to present a particular video streamdata to a user. Furthermore, a video window is not intended to be limited to application or system windows, such as windows associated with the Microsoft Windows operating system, and video windows 120, 130 and 135 can include portions or display areas of display 100 used for playback of video data associated with different video streams. The multiple video windows 120, 130 and 135 can be assigned an activity priority level. For example in one embodiment, priority is based on user access, wherein priority is assigned based on which video windows have been selected by the user in a particular order. The active video window 120 represents a window that is currently "in focus", wherein the user has currently selected the active video window 120, such as through the use of curser 115, or is capable of affecting video playback, such as through active video window 120, such as using keyboard input. Used, herein, the term "active video window" is used to describe a current highest priority video window while the term "nonactive video window" is used to describe a video window having a lower priority than the active video window and the use of the term "nonactive" may not necessarily refer to a video window having no user activity or playback activity.

Priority for each video being played can also be based on an overlay level, also known as a z-order, which describes an order in which video windows are displayed in respect to each other. A current active window, such as active video window 120, can represent a "top window" which is capable of being displayed over other windows, such as second nonactive video window 135. A "top window" can be assigned a top priority, greater than priorities assigned to second nonactive video window 135. In comparison, the second nonactive video window 135 can represent a video window that is currently running but does not represent the "top window". Accordingly, second nonactive video window 135 is assigned a lower priority than active video window 120. Furthermore, priorities can be assigned among the nonactive video windows, as will subsequently be discussed. It should be noted that a "top window" may not necessarily be considered the active window. For example, in the illustrated embodiment, the active video window 120 is displayed behind a portion of the first nonactive video window. However, the movement of curser 115 can select and effect changes in the active window, but a separate, non-active window, can still be set as a "top window", through separate settings.

Priority for each video window can also be based on a video event. For example, a detected scene change in the first nonactive video window 130 can trigger a priority change in which the first nonactive video window 130 is assigned a higher priority, such as higher than the current active video window 120. The scene change can be associated with a detected change in programming, such as based on a current time and/or electronic program guide. Alternatively, the scene change can be detected based on a change in aspect ratio. In another embodiment, a change in programming determined through received closed-captioning information is used to identify the scene change or new priority. Accordingly, the user's attention is drawn to a video window to alert the user to a change. In one embodiment, the user can be alerted to an emergency broadcast by raising the priority of a video window displaying a detected emergency bulletin alert image, emergency text in the closed-captioning information, or having an emergency alert tone transmitted in audio associated with the video window.

The user interface window 140 provides a user input to control characteristics associated with the video windows, such as video windows 120, 130 and 135, based on the assigned priority, when video is being displayed. The characteristics can include playback quality, such as an alpha blending, or transparency, level, a volume level, color setting, brightness, contrast, tint, hue, sharpness, resolution, gamma or frame-rate. The characteristics are altered to focus the attention of the user to higher priority video windows.

In the illustrated embodiment of FIG. 1, user interface window 140 provides a transparency control 150 to alter alpha blending associated with the video windows 120, 130 and 135, based on priority. The alpha blending, or transparency, associated with a video window indicates an amount of blending performed on the video window with another image, such as an image behind the video window, or a background color. A greater transparency assigned to a video window, the more "see-through" the video window becomes. Transparency control 150 includes an active transparency control 151 to alter a percentage of transparency used to display a high priority window, such as active video window 120. In the illustrated embodiment, the active transparency control 151 is set to 0 percent, indicating the active video window 120 is opaque. Thereby, active video window 120 is not transparent. or "see through", drawing attention from a user.

Transparency control 150 also includes a nonactive transparency control 152 to control a percent transparency associated with nonactive video windows, such as first nonactive video window 130 and second nonactive video window 135. In the illustrated embodiment, the nonactive transparency control 152 is set to a higher transparency than the active transparency control 151, making the nonactive video windows 130 and 135 less visible than the active video window 120. Accordingly, while a portion of the first nonactive video window 130 is displayed on top of the active video window 120, the active video window 120 can still be seen through the overlapping portion of the first nonactive video window 130. A dependant transparency control 153 allows the transparency used to display first nonactive video window 103 and second nonactive video window 135 to be dynamic, based on transparency associated with the active video window 120. Accordingly, with dependent transparency control 153 set, transparencies for the nonactive video windows 130 and 135 can be set to a proportion of what active video window 120 is set through active transparency control 151. For example, if the active transparency control 151 is set to 50 percent, the transparencies for nonactive video windows 130 and 135 will be set to 50 percent of the 50 percent the active video window 120 is set to provide 25 percent transparency.

The user interface window 140 includes a volume control 160 for controlling a playback volume of audio data that is generally received in audio streams associated with video streams of the video windows 120, 130, and 135, based on an associated priority level. Volume control 160 includes an active volume control 161 for assigning a percentage of the maximum volume used to play back the highest priority video window, such as active video window 120. Volume control 160 also includes a nonactive control 162 to assign an amount of volume to be associated with nonactive video windows, such as first nonactive video window 130 and second nonactive video window 135. A dependant volume control 163 allows the volume assigned to the nonactive video windows 130 and 135 to be based on a current volume assigned to the highest priority video window, such as active video window 120. If the dependent volume control 153 is set, volume for audio associated with nonactive video windows 130 and 135 change to remain a proportion of volume set for the active video window 120. For example, if active volume control 151 is set to 50 percent, the volume associated with nonactive video windows 130 and 135 can be automatically set to 25 percent when the dependent volume, such as the volume of the active video window 120, is set to 50 percent volume. While the availability of user interface window 140 has been described, it should be noted that the window control settings described may be preset and not available to the user.

Furthermore, it should be appreciated that other methods of applying settings to different video windows based on priority can be employed without departing from the scope of the present invention. For example, a frame rate associated with lower priority video windows, such as nonactive video windows 130 and 135, can be reduced in comparison to higher priority video windows, such as active video window 120, to highlight attention to the higher priority video windows. Video effects can be applied to different video windows based on priorities assigned to the video windows. For example, a pixelate video effect can be applied to lower priority video windows. Furthermore, by reducing playback quality, such as resolution or frame rates, in lower priority video windows, nonactive video windows 130 and 135, processing required for simultaneous playback of all video windows 120, 130 and 135 is reduced in comparison to playback at normal or optimal playback quality. Some video windows can be display video data associated with a video stream broadcast over a network, such as the Internet. Accordingly, a video window with a lower priority can be provided a lower quality video stream image to reduce playback quality. For example, a video stream with a data can be modified to have a lower display bandwidth can be used for playback of than the video data of a received video stream would otherwise support when the received video stream is associated with the video window having a lower priority. Furthermore, less processing intensive de-interlacing or noise removal algorithms (denoise filtering) can be applied to video windows having a lower priority than higher priority video windows.

Figure 2:
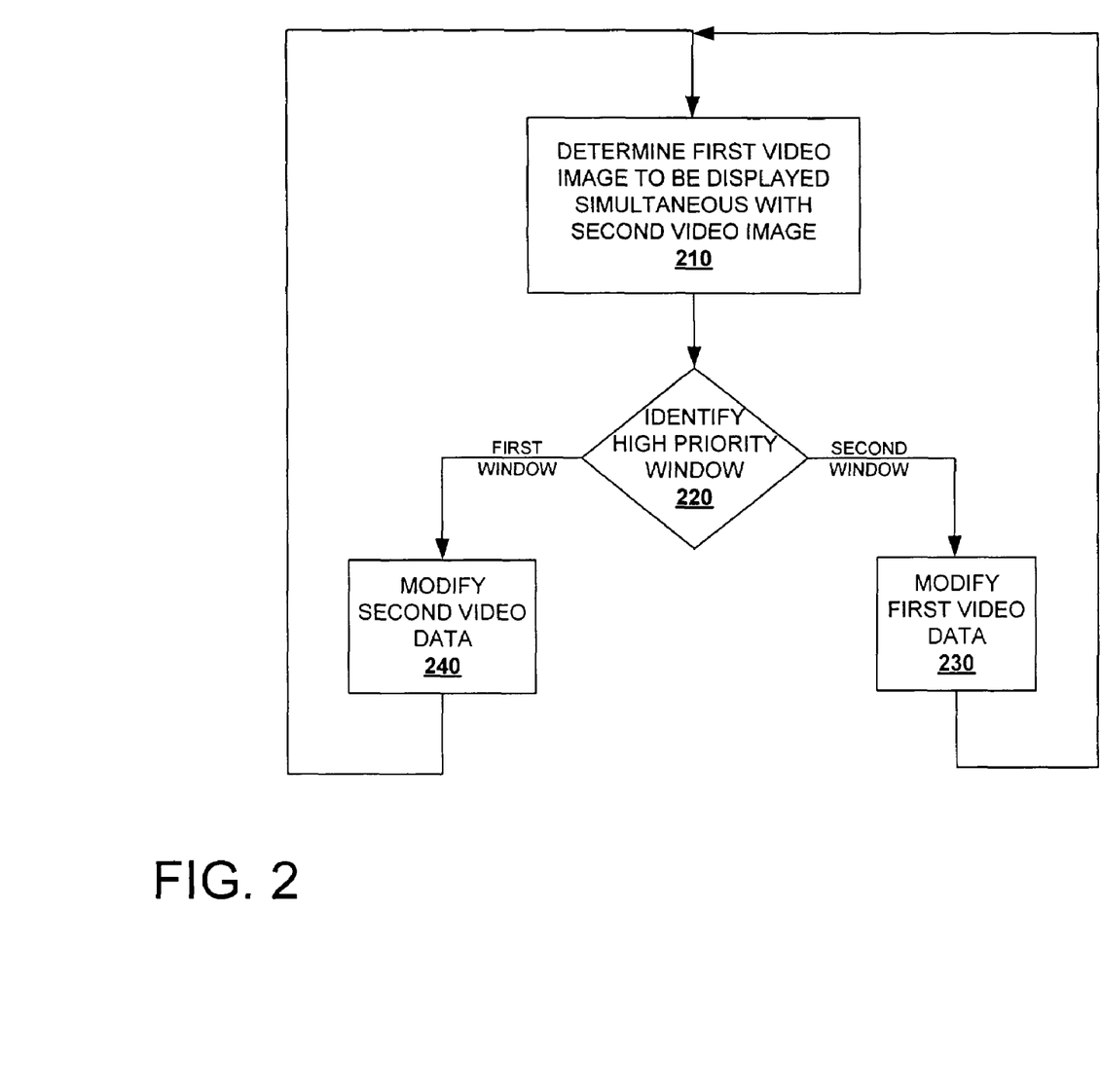
FIG. 2 is a flow diagram illustrating a method in accordance with one embodiment of the present invention.

Referring now to FIG. 2, a flow diagram illustrating a method of displaying multiple windows of video is shown and discussed with respect to FIG. 1, according to one embodiment of the present invention. At step 210 a determination is made that a first video data and a second video data are being displayed in a first and second window, respectively. With respect to FIG. 1, the first nonactive video window 130 can display the first video data, while the active video window 120 can display the second video data.

In one embodiment, it can be determined that two sets of video data are being played because a common application is responsible for initiating playback with respect to the presentation of the second video data in the active window 120 and the presentation of the first video data in the first nonactive window 130 as well as for coordinating the generation of the video screen rendered for display within their respective windows. For example, a single video card supporting multiple streams of video, such as two tuners, could be controlled by a common application having visibility to determine when multiple streams of video are being displayed in different windows in accordance with the step 210.

In another embodiment, the active video window 120 and the first nonactive video window 130 can be associated with independent, unrelated, applications. For example, the first active video window could be displaying a video data accessed over a first medium such as through an Internet protocol, while the second nonactive video window would be displaying a video data accessed via a TV tuner, such as through a cable box or other antenna device. In this embodiment, it would be necessary to have a system protocol set up for determining that multiple video streams are providing the video data being displayed. For example, the user interface window 140 could be associated with a utility that is either automatically notified, based upon a specific system protocol, or by polling active windows in a known manner, to determined that video is being displayed within windows. For example, while separate applications are used, a common software driver may be called to generate the video to be displayed. Accordingly, when particular features of the software driver are accessed, it can be determined a video is to be played. In another embodiment, the user could indicate which windows are actually displaying video. For example, a separate application can provide a list of currently running applications. The user can select applications that are providing multimedia data. The separate application can then provide commands to a common audio or video driver to modify settings for audio or video data provided from the selected applications.

It should be noted that separate video windows of the multiple video windows, such as video windows 120 and 130, typically represent displayed playback of video data associated with separate video streams. The separate video windows can include operating system or application windows used to provide playback of a related video streamdata, or different portions of a screen or display desktop used to provide playback. It should be noted that a single system used to provide video playback can include separate display devices used to provide video to a user. The displayed desktop can be provided on each display screen or span over multiple display screens. The separate video windows can also span over multiple display screens or be displayed exclusively on a single screen of a plurality of available display screens. Furthermore, separate video windows can be displayed on separate display screens.

As multiple windows presenting video simultaneously can be distracting to a user, altering characteristics associated with higher or lower priority video windows can reduce distraction and highlight a user's attention to the higher priority video windows. At step 220, a determination is made whether the first window or the second window is a higher priority window. When the first window is the higher priority window, flow proceeds to step 240. When the second window has higher priority, the flow proceeds to step 230. In one embodiment, a current active video window is considered to have the highest priority. A window currently being controlled by a user, such as through a mouse curser or keyboard input, can be identified as the current active window. Similarly, a window more recently accessed by the user can be assigned a higher priority. Alternatively, the user can assign a specific priority to each window, regardless of the user's activity.

At step 230, the data stream associated with the nonactive window, determined to be the first window, is modified to have a characteristic that is different than that of its original video signal. For example, if the first window were associated with a video data to display a first television program in a normal mode, having regular picture and sound as would typically be preset by a user to their preference, the regular picture would be modified to have a different characteristic. For example, the original video data could be modified to display, on the first nonactive window 130, the video data having a different transparency level, brightness level, color level, frame rate, or other characteristics that would generally provide an image having a reduced quality level. By providing an image with a reduced quality level in accordance with the disclosure herein, it is possible to provide an overall experience for the user that is less distracting. For example, by modifying the image to be displayed in the first window to have a more transparent image, the images displayed in the first nonactive window will be less distracting to the user relative to the images displayed in the second, active window. Furthermore, in the case of multiple display screens, properties of display screens associated with a nonactive window can be altered to draw attention to a display screen used for playback of the active window. For example, a brightness of the display screen used to provide the nonactive window can be reduced.

Likewise, when the first window is the higher priority window, and the flow proceeds to step 240, the video data to be displayed at the second nonactive window is modified such that it will have a different characteristic. For example, the video data can also be displayed having a greater level of transparency than the active window.

By modifying a characteristic of the video data to be displayed in the nonactive window, while maintaining regular settings for a higher priority window, a less distracting experience can be provided to the user while still providing sufficient information to the user to monitor multiple video streams simultaneously. Furthermore, by providing images associated with lower priority video windows at a reduced quality, processing required to provide playback of video windows associated with the lower priority video windows can be reduced.

Figure 3:
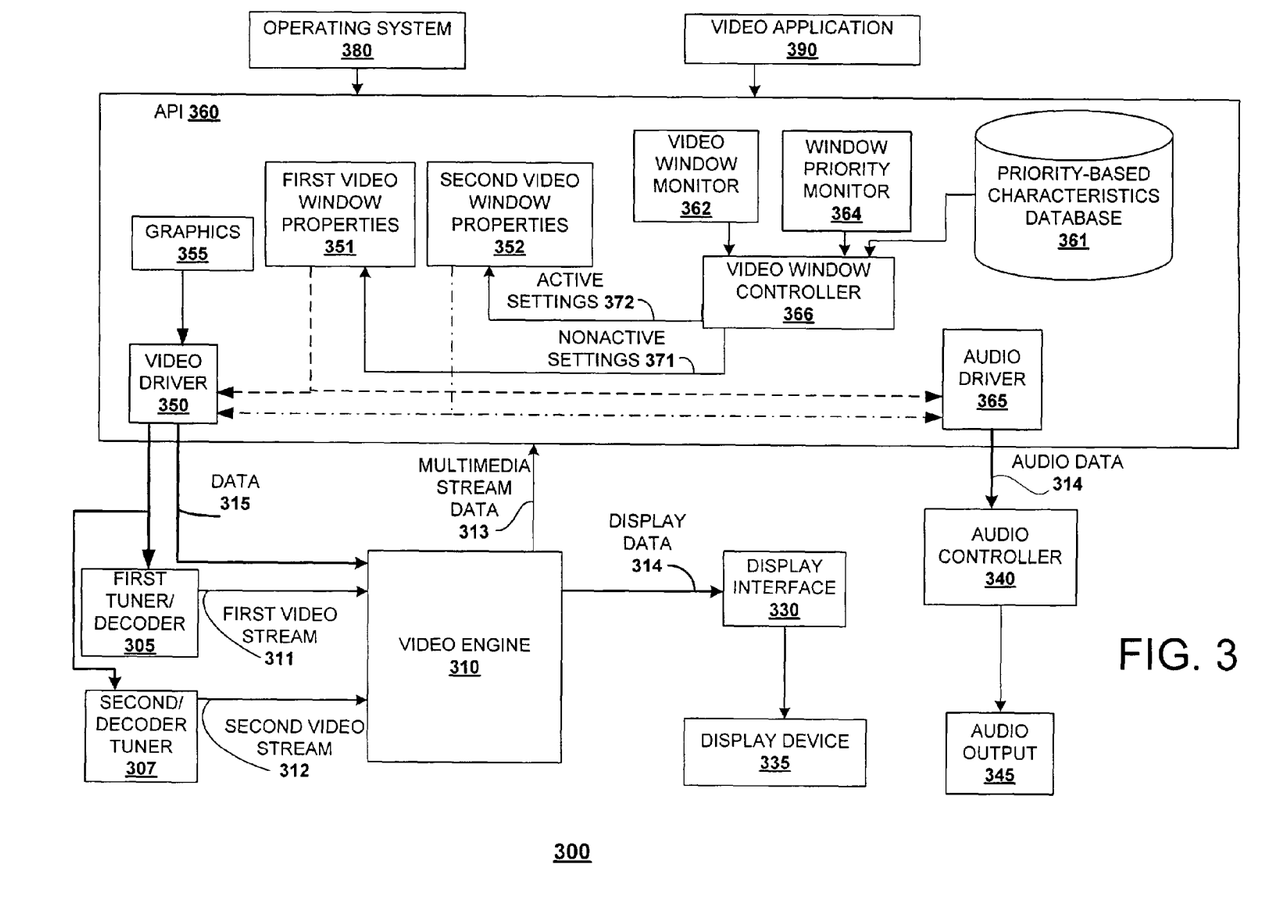
FIG. 3 is a block diagram illustrating an information handling system according to one embodiment of the present invention.

Referring now to FIG. 3, a block diagram illustrating a system for providing multiple video windows simultaneously is shown and referenced generally as system 300, according to one embodiment of the present disclosure. System 300 includes a first tuner/decoder 305, a second tuner/decoder 307, a video engine 310, a display interface 330, a display device 335, an audio controller 340, an audio output 345, a video application 390, an operating system 380, and an application programming interface (API) 360. Video engine 310 processes video streams 311 and 312, associated with tuners/decoders 305 and 307, and generates video and audio data to be provided to display device 335 and audio output 345, respectively. Video associated with the video streams 311 and 312 is provided through windows generated through video application 390. The API 360 controls multimedia parameters related to video and audio data associated with the different video streams 311 and 312 based on priorities assigned to the windows of the video streams.

In one embodiment, video application 390 is an application of operating system 380 capable of providing an environment for playback of a plurality of video streams. In one embodiment, a user selects video to be displayed from a variety of multimedia sources, such as tuners 305 and 306, multimedia files, a DVD player, or a network address. Video application 390 can instruct video engine 310 to receive and process some of the selected video streams, such as video streams 311 and 312, to be presented. The video application 390 can assign separate video windows for different video streams to be presented. The API 360 identifies and assigns priority-based settings for each of the video windows generated by the video application 390. In one embodiment, the video application 390 and the API 360 represent programs of instructions stored in a computer readable medium, or memory, such as within a hard drive, a disk drive, or random access memory (RAM).

The API 360 provides an interface between the video application 390 and operating system 380. API 360 can provide commands to operating system 380 to support functions of video application 390, such as in the generation of separate video windows. In one embodiment, a first video window is generated to support video data from the first video stream 311 and a second video window is generated to support the video data from the second video stream 312. Sets of video window properties 351 and 352 store properties controlling playback within the first and second video windows, respectively. The video window properties 351 and 352 can include video properties, such as transparency, brightness or quality, and audio properties, such as volume, for controlling playback of video and audio associated with the first window and the second window. The API 360 is capable of altering the video window properties 351 and 352 based on a priority assigned to each of the video windows.

API 360 includes a priority-based characteristics database 361 that includes settings to be applied to the video data of video streams 311 and 312 based on a priority associated with a display window used to present each of the video streams 311 and 312. API 360 includes a video window monitor 362 to identify a plurality of windows, such as the first video window and the second video window, used to present particular video streams. A window priority monitor 364 is used to identify priority levels associated with individual video windows of the plurality of video windows identified by the video window monitor 362. For example in one embodiment, window priority monitor 364 monitors user activity in video application 390 to identify video windows that represent active video windows and nonactive video windows, as previously discussed. Window priority monitor 364 may monitor user input according to a user interface 368 to identify a top priority or an active video window that is currently being controlled by a user.

A video window controller 366 generates active settings 372, to apply characteristics associated with an active video window, based on priority-based characteristics database 361, to a video data associated with the current active window, as identified by window priority monitor 364. In the illustrated embodiment, the second video window is identified as the active video window. Accordingly, the active settings 372 are applied to the second video window properties 351. Video driver 350 represents a program used to translate commands to be provided to video engine 310 or display interface 330 by the operating system 380 or the video application 390. Video driver 350 can provide data 315 to the video engine 310 and/or the first and second tuner/decoder 305 and 307 that includes commands and data to display graphics 355 and properties for handling the video streams 311 and 312.

Graphics 355 can include images and application windows associated with operating system 380. Alternatively, graphics 355 can include program or channel logos or closed-captioning to be displayed with the video windows. Audio driver 365 represents an interface for providing commands for communicating with audio controller 340. Video settings associated with the second video window properties 351 can be provided to video engine 310, through video driver 350, to control rendering or playback of the second video stream 311. Alternatively, Video settings associated with video window properties 351 can be provided to the tuners/decoders 305 and 307 to alter characteristics of their respective video streams, so that when rendered by the video engine 310, the associated video data will be modified based upon the altered characteristic. Similarly, audio settings associated with the playback of video in the second video window, are provided from second video window properties 351 to audio driver 365. Audio driver 365 uses the altered properties for providing audio stream data, associated with the second video stream 312, as a part of audio data 341 provided to the audio controller 340. While video driver 350 video engine 310 are shown and discussed for processing video settings, it should be appreciated that other methods of processing video settings can be used without departing from the scope of the present invention. In one embodiment, a software application is used to process the video settings associated with displaying the video streams 311 and 312.

Video window controller 366 also generates nonactive settings 371, to apply characteristics identified by the priority-based characteristics database 361 for nonactive windows to effect a video data, as identified by video window monitor 362 associated with windows that are given a nonactive priority, as identified by window priority monitor 364. In one embodiment video controller 366 provides the nonactive settings 371 to video engine 310 for use with generation of the video streams associated with the nonactive windows according to the nonactive window characteristic. Alternatively, video settings associated with video window properties 352, the non-active settings, can be provided to the tuners/decoders 305 and 307 to alter characteristics of their respective video streams, so that when rendered by the video engine 310, the associated video data will be modified based upon the altered characteristic. In the illustrated embodiment, the first video window, used to present the first video data, is identified as a nonactive video window. Accordingly, the video controller 366 provides the nonactive settings 371 to the first video window properties 351. Video properties can be provided to the video engine 310 or one of the tuners/decoders 305 307, through the video driver 350, to affect playback of the first video stream 311. Similarly, audio properties associated with the first video window properties are provided to the audio driver 365 to affect properties of audio stream data, associated with the first video stream 311, provided, as a part of audio data 341, to the audio controller 340. Similarly, properties associated with video window properties 351 and 352 can be provided to operating system 380.

Video engine 310 receives and processes video streams from multimedia sources identified through the video application 390. For example, in the illustrated embodiment, video engine 310 processes video streams 311 and 312 from first tuner 305 and second tuner 307, respectively. Video engine 310 can perform separate processing based on the types of video streams received. For example, in one embodiment, tuners 305 and 307 include analog television tuners. Accordingly, video engine 310 can include demodulators to generate video and audio data related to the video streams 311 and 312. Alternatively, tuners 311 and 312 can include decoders such as digital video tuners or transport stream demultiplexors to identify separate video streams of a multimedia transport stream. Accordingly, video engine 310 can include digital video processing components, such as Motion Pictures Experts Group (MPEG) processing components, to generate video and audio data from the video streams 311 and 312. It should be appreciated that other forms of video streams can also be processed without departing from the scope of the present invention. Furthermore, while video engine 310 is illustrated as a single component, video engine 310 can include several components for processing separate video streams.

Video engine 310 processes video data associated with the video streams 311 and 312 based on properties received from video driver 350. To this end, video data associated with video streams 311 and 312 can be modified by making changes to characteristics within the video streams 311 and 312, or by instructing the video engine 310 to process the video data to implement different characteristics. The video engine 310 can provide additional data, such as processed audio stream data, associated with the video streams 311 and 312, to the API 360 for further processing. The video engine 310 can also receive other video data to be processed through video data 315. The video engine 310 processes received video data, including video data 315 and video streams 311 and 312, to generate display data 314. Video engine 310 provides the display data to display interface 330.

Display interface 330 provides video to be displayed, such as display data 314, to the display device 335 according to a particular display format or protocol, such as video graphics adapter (VGA) format. Video provided by display interface 330 can be viewed on a video screen that includes multiple windows of video, such as the first video window and the second video window used to simultaneously present the first video stream 311 and the second video stream 312, such as display 100 (FIG. 1). It should be appreciated that multiple display interfaces may be used, in addition to display interface 330. Different display screens can be provided for displaying multiple windows of video. Separate video windows can be provided for display on separate display interfaces or video windows can be displayed spanning multiple display screens. Audio driver 340 provides audio data, such as audio data 341, associated with video streams 311 and 312 and operating system 380 to audio output 345. Audio output 345 can represent a speaker system, an audio receiver, or other audio playback device.

Figure 4:
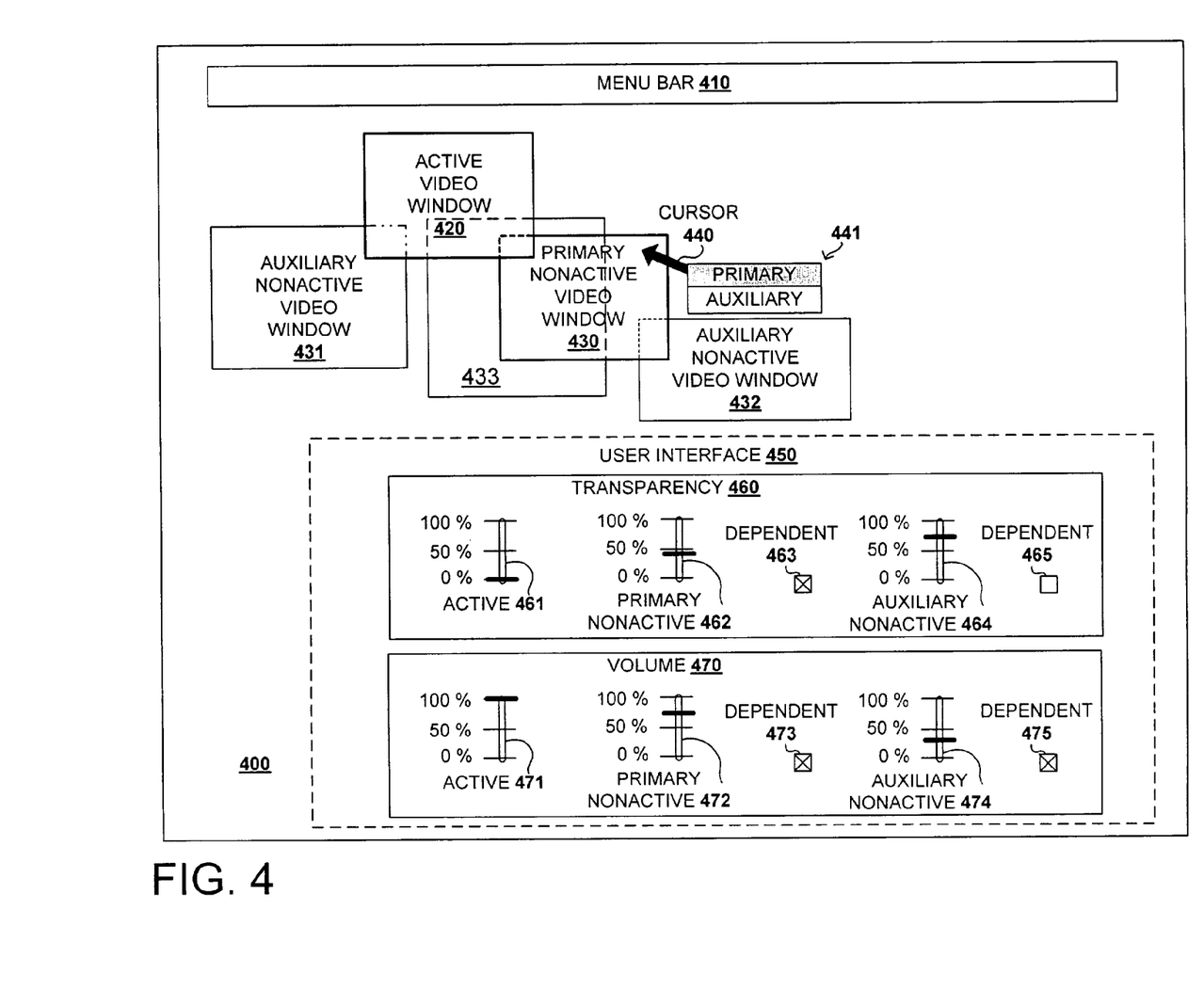
FIG. 4 is a block diagram illustrating a computer screen having multiple windows open in accordance within one embodiment of the present invention.

Referring now to FIG. 4, a block diagram illustrating a computer screen similar to the display 100 of FIG. 1 is shown and referenced generally as display 400, according to one embodiment of the present invention. Display 400 includes a menu bar 410, an active video window 420, a primary nonactive video window 430, an auxiliary nonactive video window 431, an auxiliary nonactive video window 432, a graphics window 433, a curser 430, and a user interface window 450. Similar in operation to display 100, display 400 is used to simultaneously provide multiple windows of video, such as video windows 420, 430, 431 and 432.

In one embodiment, video windows are assigned particular multimedia properties based on a level of priority associated with the video windows. The varying levels of priority can be assigned to the different video windows 420, 430, 431 and 432. For example a window that is currently being accessed by a user, such as active video window 420, can be assigned a highest priority. In comparison, nonactive video windows 430, 431 and 432 can be assigned a lower priority than the active video window 420. In the illustrated embodiment, different levels of priority may also be assigned to the nonactive video windows 430, 431 and 432. For example, a primary nonactive video window 430 can be assigned a higher priority than auxiliary nonactive video windows 431 and 432. In one embodiment, the user is able to select a priority to be assigned to a video window, such as primary nonactive video window 430. For example, the user may use curser 440 to access a priority menu 441, such as through a clicking of a mouse. Alternatively, the user may access the priority menu through menu bar 410. Furthermore, the priority associated with a video window may be determined dynamically depending upon when a window was last accessed by a user, such as through curser 440 or through keyboard input. For example, the time when the user last made a change affecting a particular video window can determine the level of priority assigned to the video window. It will further be appreciated that a non-video window, such as a graphics window 433, whereby the video windows can be blended with the graphics window as well.

User interface window 450 is used to assign characteristics to the video windows 420, 430, 431 and 432 based on the priority associated with the video windows. For example, a transparency control 460 can adjust a level of transparency associated with different video windows. An active transparency control 461 can be used to determine an amount of alpha blending, or transparency, associated with the video window having the top priority, such as active video window 420. In the illustrated embodiment, active transparency control 461 is set to 0% transparency indicating the active video window 420 is opaque. A primary nonactive transparency control 462 is used to identify an amount of transparency associated with the primary nonactive video window 430. Similarly, an auxiliary nonactive transparency control 464 is used to control the amount of transparency associated with the auxiliary nonactive video windows 431 and 432, having a priority lower than the primary nonactive video window 430.

In the illustrated embodiment, the primary nonactive transparency control 462 is set at a higher transparency level than the auxiliary nonactive transparency control 464, indicating the auxiliary nonactive video windows 431 and 432 are less visible than the primary nonactive video window 430, which in turn is less visible than the active video window 420. Accordingly, the active video window 420 can draw a user's attention greater than the nonactive video windows 430, 431 and 432. In the illustrated embodiment, dependant transparency controls 463 and 465 are used to dynamically adjust the transparency associated with the nonactive video windows 430,431 and 432 based on the transparency setting of the active video window 420. Alternatively, the adjustment of the transparency associated with the primary nonactive video window 430 and the auxiliary nonactive video windows 431 and 432 can be made relative to a maximum transparency setting. It should be appreciated that further varying levels of priority, in addition to the active, primary nonactive and auxiliary nonactive, can be assigned to video windows. Similarly, the properties of the video windows affected by priority, such as transparency control, can be based dynamically on the level of priority of the video windows.

User interface window 450 can also include a volume control 470. The volume control 470 can be used to adjust a level of volume associated with the video windows 420, 430, 431 and 432, based on the level of priority assigned to the video windows. An active volume control 471 is used to adjust the volume associated with the active video window 420. In the illustrated embodiment, the active volume control 471 is set to 100%, indicating that volume associated with the active video window 420 will be played back at the highest available volume. A primary nonactive volume control 472 is used to adjust volume associated with the primary nonactive video window 430. Similarly, the auxiliary nonactive volume control 474 is used to adjust the level of volume associated with the auxiliary nonactive video windows 431 and 432.

Dependant volume controls 473 and 475 can be used to allow the volumes associated with the primary nonactive video window 430 and auxiliary nonactive video windows 431 and 432 to be made relative to the current setting of the active video window 420, such as through active volume controls 471. For example, if the volume associated with the active video window 420 is reduced, the volumes associated with the primary nonactive video window 430 and the auxiliary nonactive video windows 431 and 432 are automatically lowered to ensure the volume associated with the active video window 420 is higher. It should be appreciated that other methods of providing settings to different video windows, such as video windows 420, 430, 431 and 432, may be used without departing from the scope of the present invention. Furthermore, the settings associated with the different video windows may be preset to fixed values. Other characteristics may also be used, such as converting a video stream associated with a particular window to black and white, to highlight a user's attention to the active video window 420 or the primary nonactive video window 430 other than illustrated herein without departing from the spirit and scope of the present invention.

Figure 5:
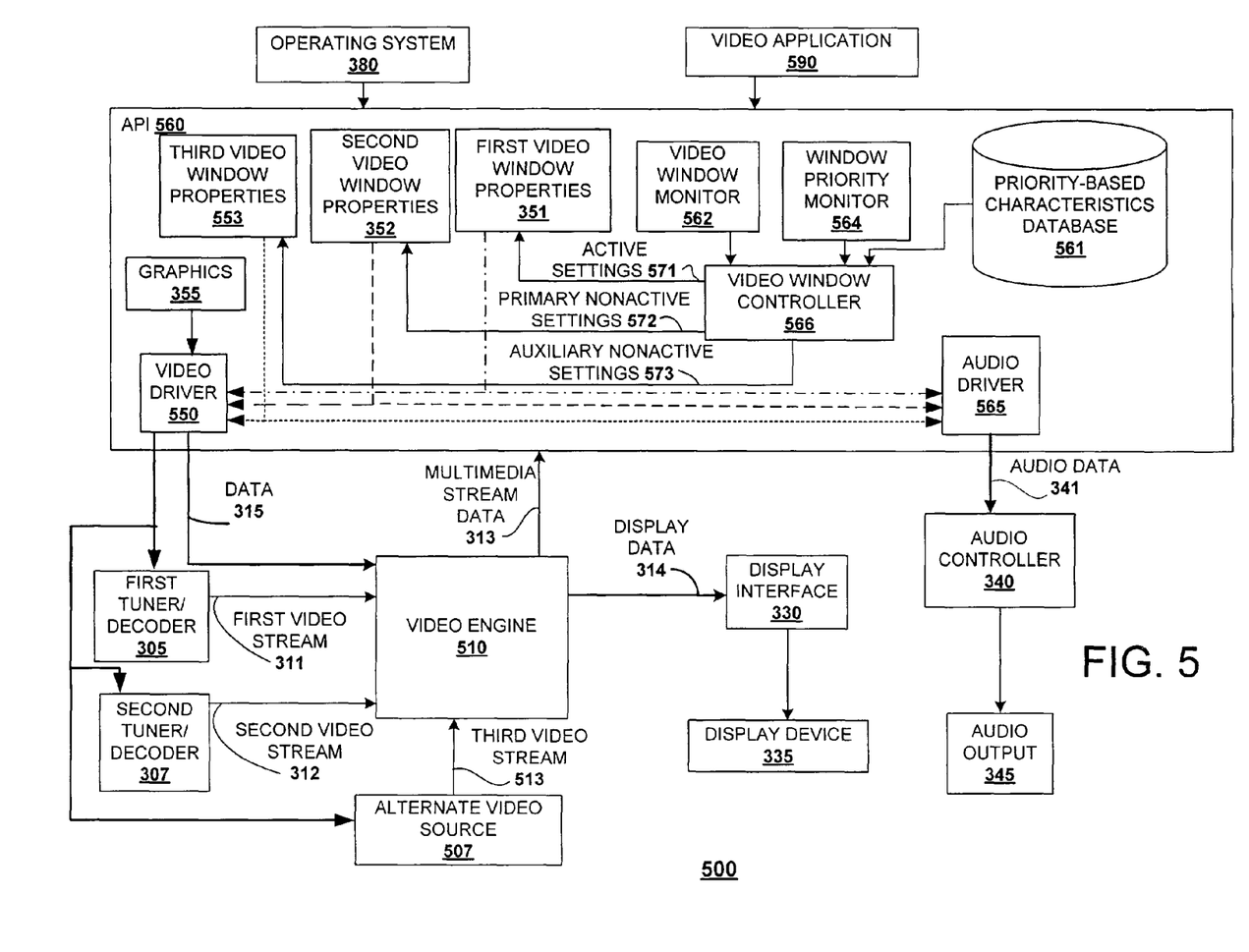
FIG. 5 is a block diagram illustrating an information handling system, according to another embodiment of the present invention.

Referring now to FIG. 5, a block diagram illustrating a system for displaying multiple video windows is shown and generally referenced as system 500, according to at least one embodiment of the present invention. System 500 operates similar to system 300 of FIG. 3. Differences between system 500 and system 300 are highlighted with respect to the addition of a third video stream 513 provided by an alternate video source 507, video engine 510, API 560, and video application 590.

Video application 590 operates similar to video application 390 of FIG. 3. In addition to supporting simultaneous playback of video streams 311 and 312, video application 590 supports playback of a third video stream 513 from the alternate video source 507. In one embodiment, the alternate video source 507 represents video streamed from a network source, such as through the Internet. It should be appreciated that other video sources can also be used in place of or in addition to the video sources illustrated in FIG. 5, such as tuners 305, 307 and alternate video source 507.

API 560 operates similar to API 360 of FIG. 3. API 560 supports video windows for presenting the video streams 311, 312 and 513. For example, a first video window (not shown) is used to support playback of the first video stream 311, a second video window (not shown) is used to support playback of the second video stream 312 and a third video window (not shown) is used to support playback of the third video stream 513. API 560 includes properties for each of the video windows. A set of first video window properties 551 track properties for the first video window, a set of second video window properties 552 track properties for the second video window and a set of third video window properties 553 track properties for the third video window. API 560 further includes a video window controller 566 to alter the sets of properties 551, 552 and 553 based on priorities assigned to each of the video windows.

The video controller 566 operates similar to video controller 366 of FIG. 3 and generates active settings 571, primary nonactive settings 572, and auxiliary nonactive settings 573, based video windows associated with particular video stream, as identified through video window monitor 562, the priority associated with a particular window, as identified through window priority monitor 564, and characteristics associated with a particular priority, as identified through priority-based characteristics database 561. In the illustrated embodiment, the window priority monitor 354 identifies the video window associated with the first video stream 311 as having the highest, or top, priority. For example, the first video window, used to display the first video stream, may be the last video window accessed or controlled by the user. Accordingly, the video controller 566 provides active settings 572, to the first video window properties 551. The first video window properties 551 can be applied to video data to be displayed on a first video window by providing the properties 551 to one or both of the video engine 510 and the first tuner/decoder 305 through video driver 550, to apply the characteristics associated with the highest priority video window to the video data. Audio properties of the first video window properties 551 can be provided to the audio driver 565 to control playback of audio data associated with the first video stream 311.

Similarly to the highest priority video window, the window priority monitor 364 identifies the second video window, used to display the second video stream 312, as being a next highest priority video window, such as primary nonactive video window 430 of FIG. 4. The second video window is considered to have a higher priority than the third video window, but a lower priority than the first video window. As previously discussed, the priority of the second video window can be determined based on a time the second video window was accessed in comparison to other video window, such as the first video window and the second video window. In an alternate embodiment, the user can set the priority of the second video window. Furthermore, in another embodiment, the priority of the second video window is determined based on the source of the second video window. For example, a particular source, such as the second tuner 307, can always be assigned a higher priority than another source, such as the alternate video source 507. Accordingly, the video controller 566 provides the primary nonactive settings 571 to the second video window properties 552. The video window properties 552 can be applied to video data to be displayed on a second video window by providing the properties 552 to one or both of the video engine 510 and the second tuner/decoder 305 through video driver 550, to apply the characteristics associated with the next priority video window to the video data. Audio properties of the second video window properties can be provided to audio driver 565 to control playback of audio data associated with the second video stream 312.

In addition, the window priority monitor 364 identifies the third video window, used to display the third video stream 511, as having a lowest priority, in comparison to the first video window and the second video window. In one embodiment, the third video window is considered an auxiliary nonactive video window, such as auxiliary nonactive video window 431 of FIG. 4. Accordingly, video controller 566 provides the auxiliary nonactive settings 573 to the third video window properties 553. The third video window properties 553 can be applied to video data to be displayed on a third video window by providing the properties 553 to one or both of the video engine 510 and a tuner/decoder that provides the third video stream 513, through video driver 550, to apply the characteristics associated with the next priority video window to the first video stream 313. Audio data of the third video window properties 553 can be provided to the audio driver 565 to control properties associated with playback of audio data associated with the third video stream 513. It should be appreciated that other methods of applying characteristics to video windows based on priority may be used without departing from the spirit or scope of the present invention.

Video engine processes each of the received video streams 311, 312 and 513 based on properties provided by the video stream and/or the video driver 550, such as with video data 315. Video data 315 can also include other video to be displayed, such as graphics 355. In one embodiment, alternate video source 507 is a part of video engine 310. In one embodiment, the video engine 510 further provides data, such as audio data, associated with the video streams 311, 312 and 513, to the API 360. While the video engine 510 is illustrated as a single component, it should be appreciated that the video engine 510 can include separate components for processing the video streams 311,312 and 513, as well as video data 315. Video engine 510 generates display data 314 to present the video streams 311m 312 and 513 as well as video windows associated with the video application 590 to the display interface 330. Similarly, the audio driver 565 provides the audio data associated with the video streams 311, 312 and 513 as well as operating system 380 to audio controller 340. It should be appreciated that other component not illustrated can be included as a part of system 500 without departing from the scope of the present invention.

Figure 6:
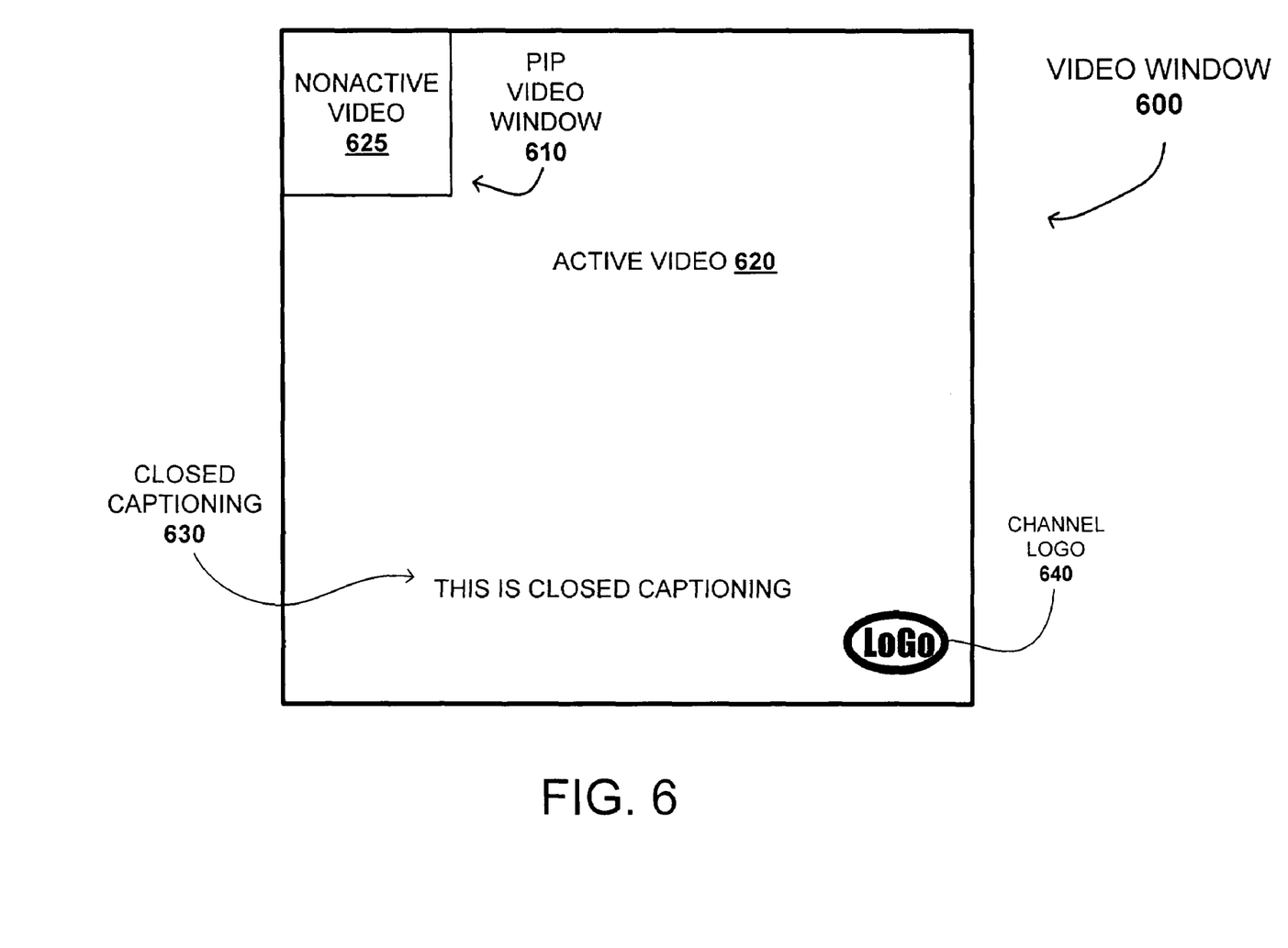
FIG. 6 is a block diagram illustrating a video window displaying multiple video streams according to one embodiment of the present invention.

Referring now to FIG. 6, a block diagram illustrating a video window displaying multiple forms of video images is shown and generally referenced as video window 600, according to at least one embodiment of the present invention. The video window 600 is primarily used to display active video 620. The video window 600 further includes a PIP video window 610 used to display a nonactive video 625. Furthermore, the video window 600 can be used to display closed-captioning 630 and a channel logo 640 associated with the active video 625.

As previously discussed, video windows can be used to refer to portions of video windows used to display alternate video. For example, the video window 600 is primarily used to display the active video 620. However, an additional video window, PIP video window 610, can be provided on top of the video window 600 to display alternate video, such as nonactive video 625. In one embodiment, the nonactive video 625 includes video that is assigned a lower priority than the active video 625. The priority determined for the videos 620 and 625 can be determined based on user access or selections. For example, a user can select the nonactive video 625 to be displayed in the PIP video window 610 while the active video 620 is to be displayed primarily on the video window 600 through system settings, such as through a remote control. Alternatively, the user may make use of keyboard controls or a mouse curser (not shown) to indicate which of the videos 620 or 625 are to be assigned higher priority. In accordance with the present invention, properties associated with the nonactive video 625, such as transparency and volume, can be altered to reduce distraction to the user from the active video 620. For example, while the nonactive video 625 is to be displayed on top of the active video 620, the transparency of the nonactive video 625 can be set to allow the user to see the active video 620 through the nonactive video 625.

Closed-captioning 630 includes closed-captioning text decoded from a transmission stream associated with the active video 620. Similarly, a channel logo 640 can be displayed to indicate the current channel associated with a carrier of the active video 620. The channel logo 640 can be provided by the user to identify the channel or carrier of the active video 620. Alternatively, the channel logo 640 can be provided by the carrier of active video 620. Similarly to closed-captioning 630, the channel logo 640 is displayed on top of the active video 620. In one embodiment, closed-captioning 630 and the channel logo 640 are considered additional video windows to be displayed on top of the active video 620.

In accordance with the present invention, properties associated with displaying the channel logo 640 and/or the closed-captioning 630 are altered to reduce distraction to the user. For example, an alpha blending, or transparency, associated with blending the closed-captioning 630 and the channel logo 640 with the active video 620 is altered to ensure the active video 620 is visible through the closed-captioning 630 and the channel logo 640. It should be appreciated that priority associated with the closed-captioning 630 or the channel logo 640 can be altered to affect display properties. For example, a detection of a particular text, such as the word "alert", can be used to increase priority associated with closed-captioning 630. Accordingly, the visibility of closed-captioning 630 can be increased to alert the user of the detected text. Furthermore, the channel logo 640 can be made more visible when a change in channel, programming, or the image of the channel logo 640 is altered. Similarly, properties associated with the nonactive video 625 can be altered to draw the users attention to the PIP video window 610 when activity, such as a scene change, in the nonactive video 625 is detected.

The systems described herein may be part of an information handling system. The term "information handling system" refers to any system that is capable of processing information or transferring information from one source to another. An information handling system may be a single device, such as a computer, a personal digital assistant (PDA), a hand held computing device, a cable set top box, an internet capable device, such as a cellular phone, and the like. Alternatively, an information handling system may refer to a collection of such devices. It should be appreciated that the system described herein has the advantage of displaying multiple windows of video simultaneously while reducing the distraction of the user's attention generated by nonactive video windows.

In the preceding detailed description of the embodiments, reference has been made to the accompanying drawings which for a part thereof, and in which is shown by way of illustration specific embodiments in which the disclosure may be practiced. These embodiments are described in sufficient detail to enable those skilled in the art to practice the disclosure, and it is to be understood that other embodiments may be utilized and logical, mechanical and electrical changes may be made without departing from the spirit or scope of the present disclosure. To avoid detail not necessary to enable those skilled in the art to practice the disclosure, the description may omit certain information known to those skilled in the art. Furthermore, many other varied embodiments that incorporate the teaching of the disclosure may be easily constructed by those skilled in the art. According, the present disclosure is not intended to be limited to the specific form set forth herein, but on the contrary, it is intended to cover such alternatives, modifications, and equivalents, as can be reasonably included within the spirit and scope of the disclosure. The preceding detailed description is, therefore, not to be taken in a limiting sense, and the scope of the present disclosure is defined only by the appended claims.

What is claimed is:

1. A method comprising:
   determining that a first video data having a first priority level based on a priority characteristic is to be displayed in a first window simultaneously with a second video data having a second priority level to be displayed in a second window, the second window being different than the first window, the priority characteristic selected from the group consisting of: z-ordering level, a video event, user activity in the first window, and a user-programmed preference;
   modifying, at a first time, in response to determining the first priority level is lower than the second priority level, the first video data to generate a modified first video data having a first alpha blending level different than the first video data;
   storing the modified first video data;
   and further comprising:
   modifying a first audio stream, associated with the first video data, to generate a modified first audio stream having a first audio characteristic different than the first audio stream based on the first priority level.

2. The method of claim 1, wherein the first audio characteristic is a volume level.

3. A method comprising:
   identifying priorities associated with a plurality of video windows, wherein the plurality of video windows include a first video window to present a first video stream and a second video window to present a second video stream;
   providing the first video stream for display with a first characteristic, when the first video window has a higher priority than the second video window; and
   providing the first video stream for display with a second characteristic, when the first video window has a lower priority than the second video window, wherein the first characteristic draws greater attention to a user than the second characteristic, wherein the first characteristic comprises an alpha blending level,
   wherein identifying priorities associated with the plurality of video windows includes identifying a time each of the video windows were accessed by a user.

4. The method as in claim 3, wherein video windows recently accessed by the user are granted a higher priority than video windows accessed at an earlier time.

* * * * *